United States Patent [19]

Yoshimitsu, deceased et al.

[11] Patent Number: 4,888,255
[45] Date of Patent: Dec. 19, 1989

[54] NON-AQUEOUS ELECTROCHEMICAL CELL

[75] Inventors: Kazumi Yoshimitsu, deceased, late of Ibaraki, Japan, by Mihoko Yoshimitsu, administratrix; Shintaro Sekido, Suita, Japan; Kenya Kazehara, Akoh, Japan; Kozo Kajita, Shiga, Japan; Toshikatsu Manabe, Ibaraki, Japan

[73] Assignee: Hitachi Maxell, Ltd., Osaka, Japan

[21] Appl. No.: 210,927

[22] Filed: Jun. 24, 1988

[30] Foreign Application Priority Data

Jun. 24, 1987 [JP] Japan .................................. 62-156948
Aug. 31, 1987 [JP] Japan .................................. 62-218435

[51] Int. Cl.⁴ ......................... H01M 4/36; H01M 6/16
[52] U.S. Cl. ..................................... 429/101; 429/196; 429/198
[58] Field of Search ..................... 429/101, 196, 198

[56] References Cited

U.S. PATENT DOCUMENTS

| | | | |
|---|---|---|---|
| 4,400,453 | 8/1983 | Blomgren et al. | |
| 4,469,763 | 9/1984 | Walsh et al. | 429/198 X |
| 4,698,283 | 10/1987 | Doddapaneni | 429/196 X |
| 4,710,437 | 12/1987 | Doddapaneni | 429/196 X |

Primary Examiner—Stephen J. Kalafut
Attorney, Agent, or Firm—Birch, Stewart, Kolasch & Birch

[57] ABSTRACT

A non-aqueous electrochemical cell comprising an anode containing an alkali metal as an essential component of the active anode material, a cathode collector comprising a carbonaceous porous shaped body and a cathode-electrolyte consisting of an ionically conductive solution of a solute in a solvent containing a liquid oxyhalide, characterized in that at least one of the electrolyte and the collector is incorporated with an aromatic compound to prevent voltage drop at the initial stage of discharge.

16 Claims, 2 Drawing Sheets

NON-AQUEOUS ELECTROCHEMICAL CELL

The present invention relates to a non-aqueous electrochemical cell. More particularly, it relates to a non-aqueous electrochemical cell which prevents voltage drop at the initial stage of discharge.

A non-aqueous electrochemical cell comprises basically an anode, a cathode collector and a cathode-electrolyte consisting of an ionically conductive solution of a solute in a solvent which includes an inorganic liquid as the active cathode material for the cell and as the solvent for the solute. A typical example of such a non-aqueous electrochemical cell is disclosed in U.S. Pat. No. 4,400,453 wherein an oxyhalide is used as the inorganic liquid which performs the dual function of being the active cathode material and acts as the solvent.

In a non-aqueous electrochemical cell of the type wherein the anode comprises an alkali metal (e.g. lithium, sodium, potassium) as a component of the active anode material and the cathode-electrolyte comprises a liquid oxyhalide (e.g. thionyl chloride, sulfuryl chloride, phosphoryl chloride) as th active cathode material and as the solvent, the alkali metal in the anode and the oxyhalide in the electrolyte are in direct contact so that an alkali metal halide is produced from the reaction between them to form a film on the surface of the anode. This film of the alkali metal halide is rough and coarse initially but develops during the storage at elevated temperatures or over a long period of time to become tight and dense, whereby the anode is inactivated. Because of this reason, the cell after storage at elevated temperatures or over a long period of time produces drop of voltage at the initial stage of discharge so that the desired level of voltage cannot be obtained. The use of such a cell as the power source for driving a mechanical instrument thus fails to accomplish the driving, smoothly and successfully. In addition, the voltage drop is produced not only by a cell discharged for the first time, but also with one discharged previously; in other words, the voltage drop is repeatedly observed on each discharge after each storage.

In order to prevent the above voltage drop at the initial period of discharge after storage, some proposals have been made. For instance, Japanese Patent Publication (unexamined) No. 249253/85 proposes to incorporate chlorinated polypropylene in the electrolyte. Further, for instance, Japanese Patent Publication (unexamined) Pat. No. 190863/86 proposes to incorporate polyethylene oxide into the electrolyte. These proposals are effective for prevention of the voltage drop when the cell is used with a relatively low current of electricity such as 0.1 to 0.5 mA/cm$^2$, for instance, as the power source for a mechanical instrument of crime prevention. When, however, the cell is used with a high current such as 1 mA/cm$^2$ or higher, particularly 5 to 30 mA/cm$^2$, for instance, as the power source for a gas meter or a watt-hour power meter, the voltage drop is not sufficiently prevented.

SUMMARY OF THE INVENTION

A main object of the present invention is to provide a non-aqueous electrochemical cell of the type using an alkali metal as the active anode material and an oxyhalide as the active cathode material for the cell and as the solvent for the electrolyte, which does not produce any voltage drop at the initial stage of discharge after storage at elevated temperatures or over a long period of time.

The above object is attained by incorporating an aromatic compound into at least one of the electrolyte and the collector in the non-aqueous electrochemical cell. Such incorporation of an aromatic compound is effective in keeping rough and coarse the film of the alkali metal halide formed on the anode and, as a result, alkali metal ion is smoothly released from the anode to the electrolyte so that voltage drop at the initial stage of discharge would not be produced.

The reason why incorporation of an aromatic compound can keep the film of the alkali metal halide rough and coarse is still not clear, but it is speculated that an aromatic compound, as incorporated in the electrolyte, may be taken into the film of the alkali metal halide or afford an influence on the film of the alkali metal halide at its formation to make such film rough and coarse. When an aromatic compound is incorporated into the collector, it may gradually dissolve into the electrolyte and then act in the same manner as above.

DETAILED DISCUSSION

The non-aqueous electrochemical cell of this invention comprises basically an anode containing an alkali metal as an essential component of the active anode material, a cathode collector comprising a carbonaceous porous shaped body and a cathode-electrolyte consisting of an ionically conductive solution of a solute in a solvent containing a liquid oxyhalide, characterized in that at least one of the electrolyte and the collector is incorporated with an aromatic compound to prevent voltage drop at the initial stage of discharge.

As understood from the above, the non-aqueous electrochemical cell of the invention may be constructed in a conventional manner, for instance, as disclosed in U.S. Pat. 4,400,453, except that an aromatic compound is incorporated into the electrolyte or the collector.

The anode may be formed of any conventional consumable metal but contains an alkali metal (e.g. lithium, sodium, potassium) as an essential active anode material. Thus, the anode may contain an alkali metal as the sole active cathode material or in combination with any other active cathode material, such as an allkine earth metal.

The cathode collector is constructed with a carbonaceous porous shaped body, usually in a cylindrical shape. As the carbon to be contained as the major component in the porous shaped body, there may be used acetylene black, carbon black, etc., and the use of acetylene black is normally preferred because of its easy availability in a highly pure state. When contaminated with impurities, their previous elimination is desired, for instance, by washing with an oxyhalide. The carbon is preferred to have a high specific surface area (e.g. about 1,500 m$^2$/g), because it reduces the volume of the collector so that a higher amount of the oxyhalide as the active cathode material can be charged into the cell, and the discharge capacity of the cell is increased.

For manufacture of the cathode collector, carbon as the major component is admixed with a binder (e.g. polytetrafluoroethylene), preferably in the form of an aqueous dispersion, and optionally graphite in a liquid medium (e.g. water, methanol, isopropanol). The resulting mixture is extruded by the aid of an extruder to give a shaped body, which is dried with hot wind and then in vacuo to make a porous shaped body. Graphite as the optional component is used as a reinforcing material, particularly for improvement of the processability, and does not participate in the discharge reaction; it should not be construed to fall within the category of the term "carbon" as the major component. In the collector, carbon is usually contained in an amount of about 75 to 95% by weight based on the total amount of the solid components therein, and the amount of the binder (as solid) may be from about 4 to 20% by weight. The amount of graphite may not be more than about 10% by weight, if used.

The cathode-electrolyte comprises a solution of a solute in a solvent including a liquid oxyhalide. The solute may be a simple or double salt which will produce an ionically conductive solution when dissolved in the solvent. Preferred solutes are complexes of inorganic or organic Lewis acids and inorganic ionizable salts. The only requirements for utility are that the salt, whether simple or complex, be compatible with the solvent being employed and that it yields a solution which is ionically conductive. Typical Lewis acids suitable for use include aluminum fluoride, aluminum bromide, aluminum chloride, antimony pentachloride, zirconium tetrachloride, phosphorus pentachloride, boron fluoride, boron chloride, boron bromide, etc. Ionizable salts useful in combination with the Lewis acids include lithium fluoride, lithium chloride, lithium bromide, lithium sulfide, sodium fluoride, sodium chloride, sodium bromide, potassium fluoride, potassium chloride, potassium bromide, etc. It will be obvious to those skilled in the art that the double salts formed by a Lewis acid and an inorganic ionizable salt may be used as such or the individual components may be added to the solvent separately to form the salt of the resulting ions in situ. Of such double salts, for example, is that formed by the combination of aluminum chloride and lithium chloride to yield lithium aluminum tetrachloride. Examples of other double salts are LiAlBr$_4$, LiGaCl$_4$, LiB$_{10}$Cl$_{10}$, etc.

Useful electrolyte solvents, which additionally act as cathode depolarizers within the system, are oxyhalides of elements of Group V and VI of the Periodic Table. These elements encompass those of Groups V-A, V-B, VI-A and VI-B of the Periodic Table. These oxyhalides are generally liquids at normal temperatures, especially around 25° C., and possess good diffusional and electrochemical properties. The term "oxyhalide" includes, in addition to simple oxyhalides, such compounds as mixed halides and oxyhalides of combinations of two or more elements from Group V or VI of the Periodic Table. Specific examples of the oxyhalide are phosphoryl chloride, vanadyl trichloride, vanadyl tribromide, thionyl chloride, thionyl bromide, sulfuryl chloride, chromyl chloride, selenium oxychloride, etc.

If desired, a co-solvent may be added to the oxyhalide compound to achieve better conductivity. Specific examples of the co-solvent are propylene carbonate, nitrobenzene, dimethyl sulfoxide, etc. In addition, if it is desired to render the electrolyte solution more viscous or convert it into a gel, a gelling agent such as colloidal silica may be added.

As stated above, the non-aqueous electrochemical cell of the invention is characterized by being incorporated with an aromatic compound, i.e. in the electrolyte and/or the collector.

The term "aromatic compound" as herein used covers a wide range of compounds having at least one aromatic ring, preferably not more than seven aromatic rings, and usually a molecular weight of not more than about 600, particularly 78 to 500, more particularly 78 to 341. The aromatic compound may be monocyclic or polycyclic, and when two or more aromatic rings are present therein, they may be condensed or non-condensed. The aromatic ring(s) are usually five or six-membered and may be carbocyclic or heterocyclic, preferably those constructed with carbon atoms and optionally oxygen and/or sulfur atoms.

The aromatic compound may have one or more substituents on the aromatic ring(s). Examples of the substituents are lower alkyl (e.g. methyl, ethyl, propyl, butyl), hydroxyl, oxo, halo (e.g. chloro, bromo), etc.

Specific examples of the aromatic compound are benzothiophene, dibenzothiophene, 1,2-dibenzodiphenylene sulfide, thiathrene, thioxanthen-9-one, 2-phenyl-1,3-dithiane, thiochroman-4-one, 2-phenylbenzothiophene, 4-phenylthiophene, diphenyl disulfide, 2,4,6-trichlorobenzothiophene, 2,4,7-trichlorobenzothiophene, benzene, toluene, o-xylene, m-xylene, p-xylene, 2,6-di-t-t-butyl-1,4-dibenzoquinone, naphthalene, biphenyl, anthracene, phenanthrene, 1,8-naphthalic anhydride, fluoranthene, pyrene, acenaphthene, 9,10-dihydrophenanthrene, 1,3,6,8,10-pentachloroanthracene, 2,5,8,11-tetrachloronaphthalene, 2,4,6,8,10-pentachloropyrene, 2,4,7-trichlorofluorene, 2,4,7-trichloro-9-fluorenone, tetrachlorophthalic anhydride, 1,10-anthraquinone, 2,7-dichloro-9-fluorenone, 9,10-dichloroanthracene, 2,3,6,7-tetrachloroanthraquinone, fluorene, dibenzofuran, 1,2,3,6,7,8-hexahydropyrene, 4H-cyclopenta[def]phenanthrene, 2,3-benzofluorene, 2,3-benzanthracene, 1,2-benzanthracene, 9-phenylfluorene, 9-phenylanthracene, perylene, pentacene, triphenylene, benzo[e]pyrene, benzo[a]pyrene, 9,10-diphenylanthracene, coronene, 1,4,5,8-naphthalene tetracarboxylic dianhydride, 1,4-naphthoquinone, 6,13-pentacenequinone, xanthene, xanthone, acenaphthenequinone, acenaphthylene, benzo[ghi]perylene, 5,12-naphthacenequinone, 1,2,3,4-dibenzanthracene, 1,2,5,6-dibenzanthracene, 9,9'-bifluorene, chrysene, fluorenone, 1,3-benzodioxole, 1,4-chrysenquinone, 1,2,3,6,7,8,11,12-octahydrobenzo[e]ypren-9(10H)-one, 1,2-naphthoquinone, 3,4,9,10-perylenetetracarboxylic dianhydride, decacyclene, 9,10-dihydrobenzo[a]pyren-7(8H)-one, dihydrocoumarin, 1,4,4a,9a-tetrahydroanthraquinone, benz[a]anthracene-7,12-dione, benzanthrone, etc. These may be used alone or in the form of mixture (e.g. bitumen, humic acid).

Among various aromatic compounds, preferred are carbocyclic compounds having at least two benzene rings, oxygen or sulfur-containing compounds (especially those comprising at least one benzene ring and at least one oxygen or sulfur-containing ring), etc. from the viewpoint of their incorporation effect. Their halogenated, particularly chlorinated, derivatives are also preferred. With the increased number of the aromatic rings, the solubility of the aromatic compounds in the electrolyte usually decreases, and the aromatic compounds are generally favored to have not more than 7 aromatic rings.

Specific examples of the aromatic compound as preferred are sulfur-containing compounds comprising a benzene ring and a sulfur-containing heterocyclic ring and their chlorinated derivatives (e.g. benzothiophene, dibenzothiophene, 4-phenylthiophene, thiochroman-4-one, thioxanthen-9-one, 2,4,6-trichlorobenzothiophene, 2,4,7-trichlorodibenzothiophene, oxygen-containing compounds comprising a benzene ring and an oxygen-containing heterocyclic ring and their chlorinated derivatives (e.g. 2,6-di-t-butyl-1,4-benzoquinone, 1,8-naphthalic anhydride, 9,10-anthraquinone, tetrachlorophthalic anhydride, 2,3,6,7-tetrachloroanthraquinone), carboxylic compounds comprising two or more benzene rings (e.g. naphthalene, anthracene, pyrene, 1,2-benzanthracene, 2,3-benzanthracene, perylene, pentacene, triphenylene, benz[a]pyrene, 1,2,3,4-dibenzanthracene, 1,2,5,6-dibenzanthracene, benz[ghi]perylene, coronene), etc.

Of the aromatic compounds as stated above, the non-halogenated ones may be halogenated with the oxyhalide in the electrolyte during the storage or use of the cell.

The amount of the aromatic compound to be incorporated into the cell may be such as keeping its concentration in the electrolyte between about $1\times10^{-6}$ and $1\times10^{-2}$ mol/l, preferably about $1\times10^{-5}$ and $1\times10^{-3}$ mol/l. When the concentration is lower than the lower limit, the film of the alkali metal halide is not sufficiently rough and coarse. When the concentration is higher than the upper limit, the aromatic compound affords an unfavorable influence on the discharge characteristics a the discharge for the first time so that the drop of voltage or quantity of electricity is produced at the initial stage of discharge. Further, the increase of the amount of the aromatic compound results in a decrease of the amount of the active cathode material chargeable in the cell so that the quantity of electricity as discharged is lowered.

Incorporation may be made directly into the electrolyte, or into the collector. In the former case, the electrolyte may be prepared from the beginning to contain the concentration of the aromatic compound. In the latter case, the collector is prepared to include the aromatic compound in such an amount that the aromatic compound is released therefrom into the electrolyte to maintain the desired concentration. Specifically, the content of the aromatic compound in the collector may be from about 0.05 to 20% by weight, preferably from about 1.0 to 10% by weight on the basis of the total weight of the solid components in the collector. When the amount is lower than the lower limit, the desired effect can not be obtained. When higher than said upper limit, the shaping property of the collector and the performances of the cell are deteriorated.

The releasing (or dissolving) rate of the aromatic compound from the collector into the electrolyte is varied with the kind of the aromatic compound. When the number of the aromatic rings is increased, the solubility into the electrolyte is decreased, and the releasing rate is lowered. In general, the aromatic compound comprising a larger number of aromatic rings, particularly 4 or more aromatic rings, is favorable, because a higher amount can be incorporated into the collector without causing its excessive release into the electrolyte and thus resulting in less depression of the discharge quantity of electricity at the initial stage, whereby the voltage drop at the initial stage of discharge can be prevented even after the discharge is made to a greater depth. Examples of the favorable aromatic compound from the above viewpoint are pyrene, 1,2-benzanthracene, 2,3-benzanthracene, perylene, pentacene, triphenylene, benz[a]pyrene, 1,2,3,4-dibenzanthracene, 1,2,5,6-dibenzanthracene, benz[ghi]perylene, coronene, etc.

If desired, the incorporation of the aromatic compound may be made into the collector and into the electrolyte. In such a case, the amounts of the aromatic compound to be incorporated into the electrolyte and the collector may be more or less decreased in comparison with the amounts as given for the sole incorporation into the electrolyte or the collector.

Brief Description of the Drawings

With reference to the accompanying drawings, some practical embodiments of the invention will be hereinafter explained in more detail.

Referring now to FIG. 1 there is seen a section view an embodiment of the non-aqueous electrochemical cell according to the invention including an anode 1, a cell container 2, a cathode 3, an electrolyte 4, a separator 5, a cathode collector 6, a cell cap 7, a glass layer 8, a cathode terminal 9, a bottom separator member 10, an upper separator member 11 and an air chamber 12.

Referring to FIG. 2 there is seen a graph showing the discharge characteristics of the cells as given in the following Example 1 and as given in Comparative Example 1, the abscissa being the discharge time (hour) and the ordinate being the cell voltage (V).

PREFERRED EMBODIMENTS

In the following Examples, part(s) and % are by weight unless otherwise indicated.

EXAMPLE 1

Figure 1:
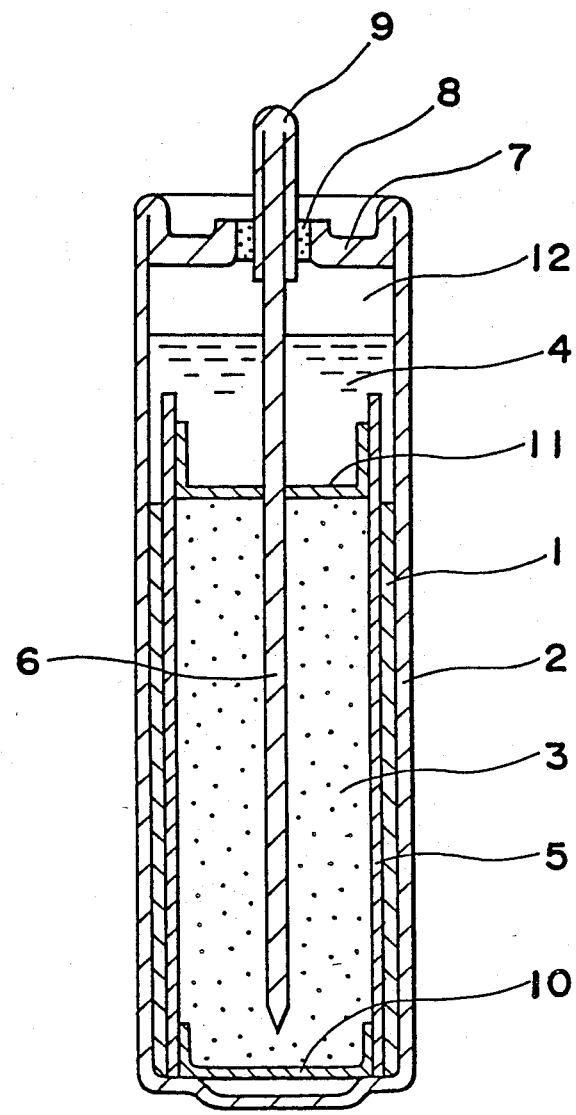
FIG. 1 is a section view of an embodiment of the non-aqueous electrochemical cell according to the invention.

A non-aqueous electrochemical cell of the thionyl chloride-lithium system (Unit III), of which the section view is as shown in FIG. 1 of the accompanying drawing, was manufactured using thionyl chloride as the active cathode material, lithium as the active anode material and a thionyl chloride solution of 1.2 mol/l of LiAlCl$_4$ (prepared from LiCl and AlCl$_3$) and $7\times10^{-4}$ mol/l of benzothiophene as the electrolyte. The thionyl chloride in the electrolyte has the dual function of being a solvent for the electrolyte and acting as an active cathode material for the cell.

In FIG. 1, the inside of a cell container 2 made of stainless steel in a cylindrical shape having a bottom is lined with a sheet of lithium to make an anode 1. A cathode 3 consists of a porous shaped body (void, 85% by volume) prepared by press-molding a mixture comprising 100 part of acetylene black, 20 parts of an aqueous dispersion of polytetrafluoroethylene (solid content, 60%), 250 parts of water and 120 parts of isopropanol into a cylinder, drying the cylinder with hot wind of 60° C. for 12 hours and evaporating volatile components therefrom at 150° C. in vacuo for 3 hours. The cell contains 3.9 ml of the electrolyte 4 having the composition as stated above. A separator 5 made of glass fiber is formed in a cylindrical shape and serves to separate the anode 1 and the cathode 3. A cathode collector 6 is constructed with a stainless steel rod, while a cell cap 7 is made of stainless steel, of which the outer periphery is joined with the opening edge of the cell container 2 by welding. Between the inner periphery of the cell cap 7 and a cathode terminal 9, a glass layer 8 is provided and serves as an insulating material, the outer and inner peripheries of the glass layer 8 being melt-joined respectively with the inner periphery of the cell cap 7 and the outer periphery of the cathode terminal 9 to make sealing between the cell cap 7 and the cathode terminal 9.

The opening portion of the cell container 2 is sealed by hermetic sealing.

On assembly of the cell, the cathode terminal 9 made of stainless steel is in the shape of a pipe, and its opening top serves as an entrance for charging the electrolyte. After charging of the electrolyte, the top opening is sealed by welding together with the upper part of the cathode collector 6 inserted into the cathode terminal 9. A bottom separator member 10 is made of a non-woven fabric of glass fibers and serves for separation of the cathode 3 from the cell container 2 which is also available as the anode terminal. An upper separator member 11 is made of a nonwoven fabric of glass fibers and serves for separation of the cathode 3 from the cell cap 7 which is also available as the anode terminal. At the upper inside of the cell, an air chamber 12 is provided to absorb the volume expansion of the electrolyte at elevated temperatures.

EXAMPLE 2

In the same manner as in Example 1 but using dibenzothiophene ($7 \times 10^{-4}$ mol/l) in place of benzothiophene, there was manufactured a non-aqueous electrochemical cell of the thionyl chloride-lithium system (Unit III).

EXAMPLE 3

In the same manner as in Example 1 but using 4-phenylthiophene ($7 \times 10^{-4}$ mol/l) in place of benzothiophene, there was manufactured a non-aqueous electrochemical cell of the thionyl chloride-lithium system (Unit III).

EXAMPLE 4

In the same manner as in Example 1 but using thiochroman-4-one ($7 \times 10^{-4}$ mol/l) in place of benzothiophene, there was manufactured a non-aqueous electrochemical cell of the thionyl chloride-lithium system (Unit III).

EXAMPLE 5

In the same manner as in Example 1 but using thioxanthen-9-one ($7 \times 10^{-4}$ mol/l) in place of benzothiophene, there was manufactured a non-aqueous electrochemical cell of the thionyl chloride-lithium system (Unit III).

EXAMPLE 6

In the same manner as in Example 1 but using 2,4,6-trichlorobenzothiophene ($7 \times 10^{-4}$ mol/l) in place of benzothiophene, there was manufactured a non-aqueous electrochemical cell of the thionyl chloride-lithium system (Unit III).

EXAMPLE 7

In the same manner as in Example 1 but using 2,4,7-trichlorobenzothiophene ($1 \times 10^{-3}$ mol/l) in place of benzothiophene, there was manufactured a non-aqueous electrochemical cell of the thionyl chloride-lithium system (Unit III).

EXAMPLE 8

In the same manner as in Example 1 but using $7 \times 10^{-5}$ mol/l of benzothiophene in place of $7 \times 10^{-4}$ ml/l, there was manufactured a non-aqueous electrochemical cell of the thionyl chloride-lithium system (Unit III).

EXAMPLE 9

In the same manner as in Example 1 but using $7 \times 10^{-3}$ mol/l of benzothiophene in place of $7 \times 10^{-4}$ ml/l, there was manufactured a non-aqueous electrochemical cell of the thionyl chloride-lithium system (Unit III).

EXAMPLE 10

In the same manner as in Example 1 but using 2,6-di-t-butyl-1-1,4-benzoquinone ($7 \times 10^{-4}$ mol/l) in place of benzothiophene, there was manufactured a non-aqueous electrochemical cell of the thionyl chloride-lithium system (Unit III).

EXAMPLE 11

In the same manner as in Example 1 but using 1,8-naphthalic anhydride ($1 \times 10^{-3}$ mol/l) in place of benzothiophene, there was manufactured a non-aqueous electrochemical cell of the thionyl chloride-lithium system (Unit III).

EXAMPLE 12

In the same manner as in Example 1 but using 9,10-anthraquinone ($1 \times 10^{-3}$ mol/l) in place of benzothiophene, there was manufactured a non-aqueous electrochemical cell of the thionyl chloride-lithium system (Unit III).

EXAMPLE 13

In the same manner as in Example 1 but using tetrachlorophthalic anhydride ($1 \times 10^{-3}$ mol/l) in place of benzothiophene, there was manufactured a non-aqueous electrochemical cell of the thionyl chloride-lithium system (Unit III).

EXAMPLE 14

In the same manner as in Example 1 but using 2,3,6,7-tetrachloroanthraquinone ($1 \times 10^{-3}$ mol/l) in place of benzothiophene, there was manufactured a non-aqueous electrochemical cell of the thionyl chloride-lithium system (Unit III).

EXAMPLE 15

In the same manner as in Example 1 but using naphthalene ($5 \times 10^{-3}$ mol/l) in place of benzothiophene, there was manufactured a non-aqueous electrochemical cell of the thionyl chloride-lithium system (Unit III).

EXAMPLE 16

In the same manner as in Example 1 but using anthracene ($5 \times ^{-3}$ mol/l) in place of benzothiophene, there was manufactured a non-aqueous electrochemical cell of the thionyl chloride-lithium system (Unit III).

EXAMPLE 17

In the sam manner as in Example 1 but using pyrene ($1 \times 10^{-3}$ mol/l) in place of benzothiophene, there was manufactured a non-aqueous electrochemical cell of the thionyl chloride-lithium system (Unit III).

EXAMPLE 18

In the same manner as in Example 1 but using 2,3-benzanthracene ($7 \times 10^{-4}$ mol/l) in place of benzothiophene, there was manufactured a non-aqueous electrochemical cell of the thionyl chloride-lithium system (Unit III).

EXAMPLE 19

In the same manner as in Example 1 but using pentacene ($1 \times 10^{-3}$ mol/l) in place of benzothiophene, there was manufactured a non-aqueous electrochemical cell of the thionyl chloride-lithium system (Unit III).

EXAMPLE 20

In the same manner as in Example 1 but using 1,2,3,4-dibenzanthracene ($5 \times 10^{-4}$ mol/l) in place of benzothiophene, there was manufactured a non-aqueous electrochemical cell of the thionyl chloride-lithium system (Unit III).

EXAMPLE 21

In the same manner as in Example 1 but using coronene ($5 \times 10^{-4}$ mol/l) in place of benzothiophene, there was manufactured a non-aqueous electrochemical cell of the thionyl chloride-lithium system (Unit III).

EXAMPLE 22

In the same manner as in Example 1 but using 2,4,7-trichlorofluorene ($1 \times ^{-3}$ mol/l) in place of benzothiophene, there was manufactured a non-aqueous electrochemical cell of the thionyl chloride-lithium system (Unit III).

COMPARATIVE EXAMPLE 1

In the same manner as in Example 1 but not adding any aromatic compound such as benzothiophene, there was manufactured a non-aqueous electrochemical cell of the thionyl chloride-lithium system (Unit III).

COMPARATIVE EXAMPLE 2

In the same manner as in Example 1 but using chlorinated polyethylene (0.1 g/l) in place of benzothiophene, there was manufactured a non-aqueous electrochemical cell of the thionyl chloride-lithium system (Unit III).

The amount (0.1 g/l) of chlorinated polyethylene is nearly equal to the amount (0.094 g/l) corresponding to $7 \times 10^{-4}$ mol/l of benzothiophene as used in example 1. If $7 \times 10^{-4}$ mol/l of chlorinated polyethylene is used, it is too great so that deterioration of the cell performances will be produced.

COMPARATIVE EXAMPLE 3

In the same manner as in Example 1 but using polyethylene oxide (0.1 g/l) in place of benzothiophene, there was manufactured a non-aqueous electrochemical cell of the thionyl chloride-lithium system (Unit III).

The amount (0.1 g/l) of polyethylene oxide is nearly equal to the amount (0.094 g/l) corresponding to $7 \times 10^{-4}$ mol/l of benzothiophene as used in Example 1. If $7 \times 10^{-4}$ mol/l of polyethylene oxide is used, it is too great so that deterioration of the cell performances will be produced.

The non-aqueous electrochemical cells as obtained in Examples 1 to 22 and Comparative Examples 1 to 3 were stored at 60° C. for 20 days, and their discharge characteristics were examined under continuous discharge with a load of 100 ohms at 20° C.

Figure 2:
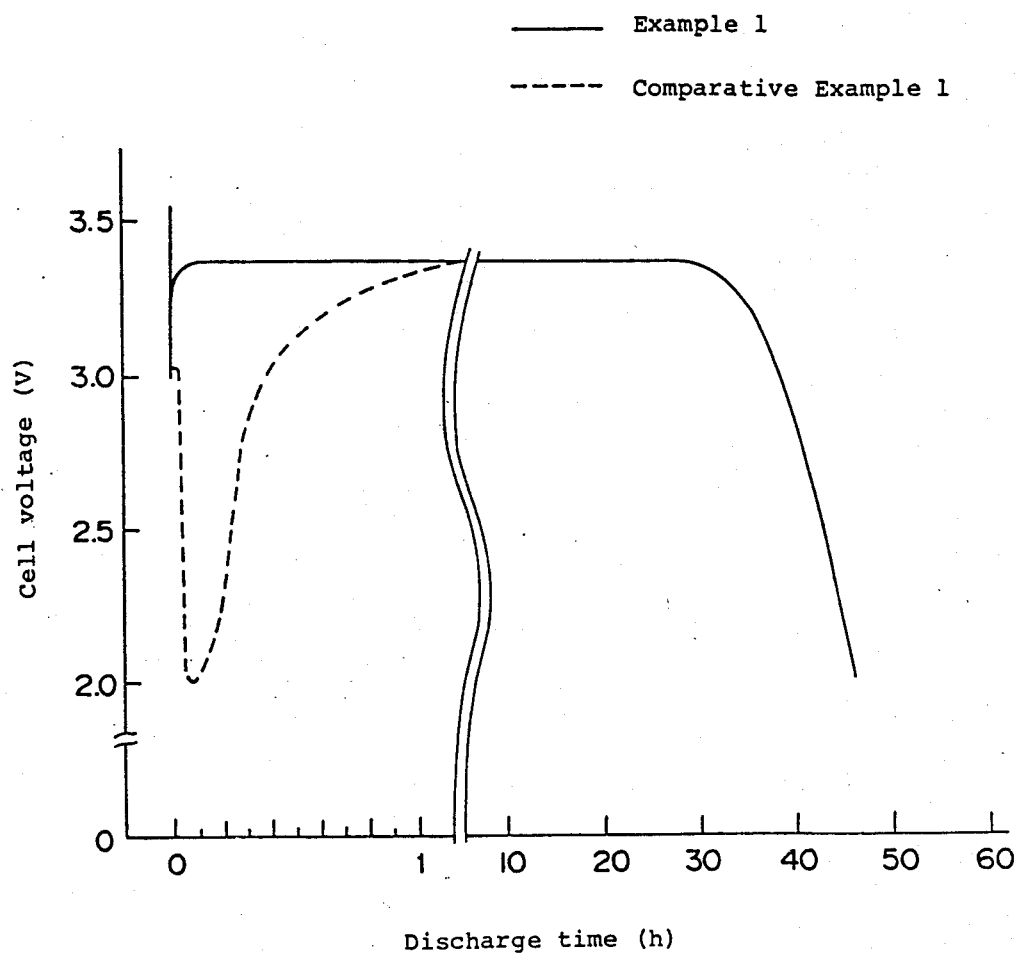
FIG. 2 is a graph showing the discharge characteristics of the cells as given in the following Example 1 as given in Comparative Example 1.

The discharge characteristics of the cells in Example 1 and Comparative Example 1 are shown in FIG. 2 of the accompany drawing. (The discharge characteristics of the cells in Examples 2 to 22 give curves similar to those of the cell in Example 1.) From FIG. 2, it is clear that the cell of Comparative Example 1 containing no aromatic compound in the electrolyte shows distinct voltage drop at the initial stage of discharge, while the cell in Example 1 does not show any voltage drop. The cell containing chlorinated polyethylene (Comparative Example 2) or polyethylene oxide (Comparative Example 3) in the electrolyte gave a high current density such as bout 3.4 mA/cm² under a moderate load of 100 ohms so that any substantial preventing effect of voltage drop could not be obtained. Thus, the discharge characteristics of such cell were similar to those of the cell of Comparative Example 1.

Further, the cells as obtained in Examples 1 to 22 and Comparative Examples 1 to 3 were stored at 60° C. for 20 days and subjected to measurement of the cell voltage after discharge with a load of 10 ohms for 50 milliseconds (ms) at 20° C. The results are shown in Table 1.

TABLE 1

| Example No. | Aromatic compound incorporated into electrolyte | Amount (mol/liter) | Voltage upon discharge with a load of 10 ohms for 50 ms at 20° C.) |
| --- | --- | --- | --- |
| 1 | Benzothiophene | $7 \times 10^{-4}$ | 2.075 |
| 2 | Dibenzothiophene | $7 \times 10^{-4}$ | 2.001 |
| 3 | 4-Phenylthiophene | $7 \times 10^{-4}$ | 1.970 |
| 4 | Thiochroman-4-one | $7 \times 10^{-4}$ | 1.890 |
| 5 | Thioxanthen-9-one | $7 \times 10^{-4}$ | 1.602 |
| 6 | 2,4,6-Trichlorobenzothiophene | $1 \times 10^{-3}$ | 2.107 |
| 7 | 2,4,7-Trichlorodibenzothiophene | $1 \times 10^{-3}$ | 1.974 |
| 8 | Benzothiophene | $7 \times 10^{-5}$ | 2.149 |
| 9 | Benzothiophene | $7 \times 10^{-3}$ | 1.625 |
| 10 | 2,6-Di-t-butyl-1,4-benzoquinone | $7 \times 10^{-4}$ | 1.583 |
| 11 | 1,8-Naphthalic anhydride | $1 \times 10^{-3}$ | 1.606 |
| 12 | 9,10-Anthraquinone | $1 \times 10^{-3}$ | 1.721 |
| 13 | Tetrachlorophthalic anhydride | $1 \times 10^{-3}$ | 1.744 |
| 14 | 2,3,6,7-Tetrachloroanthraquinone | $1 \times 10^{-3}$ | 1.815 |
| 15 | Naphthalene | $5 \times 10^{-3}$ | 2.004 |
| 16 | Anthracene | $5 \times 10^{-3}$ | 1.990 |
| 17 | Pyrene | $1 \times 10^{-3}$ | 2.100 |
| 18 | 2,3-Benzanthracene | $7 \times 10^{-4}$ | 1.690 |
| 19 | Pentacene | $1 \times 10^{-3}$ | 1.664 |
| 20 | 1,2,3,4-Dibenzanthracene | $5 \times 10^{-4}$ | 1.576 |
| 21 | Coronene | $5 \times 10^{-4}$ | 1.502 |
| 22 | 2,4,7-Trichlorofluorene | $1 \times 10^{-3}$ | 1.764 |
| Comparative | | | |
| 1 | — | 0.1 g/l | 1.189 |
| 2 | Polyethylene chloride | 0.1 g/l | 1.203 |

TABLE 1-continued

| Example No. | Aromatic compound incorporated into electrolyte | Amount (mol/liter) | Voltage upon discharge with a load of 10 ohms for 50 ms at 20° C.) |
|---|---|---|---|
| 3 | Polyethylene oxide | 0.1 g/l | 1.200 |

As seen in Table 1, the cell of Comparative Example 1 containing no aromatic compound produced great voltage drop at the initial stage of discharge and gave a voltage of 1.189 V, while the cells of Examples 1 to 22 containing an aromatic compound did not produce any significant voltage drop and gave a voltage of 1.502 to 2.149 V. The cells of Comparative Examples 2 and 3 respectively containing chlorinated polyethylene and polyethylene oxide showed 1.203 V and 1.200 V, which are almost same level as in Comparative Example 1; incorporation of chlorinated polyethylene or polyethylene oxide thus can not produce any preventive effect for voltage drop.

EXAMPLE 23

A mixture comprising 100 parts of acetylene black, 20 parts of an aqueous dispersion of polytetrafluoroethylene (solid content, 60%), 2.3 parts of pyrene, 250 parts of water and 120 parts of isopropanol was extrusion-molded in a cylindrical shape, and the resulting cylinder was dried with hot wind of 60° C. for 12 hours and in vacuo at 80° C. for 3 hours to make a porous shaped body of 10.5 mm in diameter, 30 mm in length and 85% by volume in void. The amount of pyrene incorporated into the collector was 2.0% on the basis of the total weight of the solid components in the collector.

Separately, LiCl and AlCl3 were dissolved in thionyl chloride to make a thionyl chloride solution of LiAlCl4 (1.2 mol/l).

Using the above prepared porous shaped body as the cathode collector 3 and the above prepared thionyl chloride solution of LiAlCl4 (3.9 ml) as the electrolyte 4, there was manufactured a non-aqueous electrochemical cell of the thionyl chloride-lithium system (Unit III) as shown in FIG. 1. The theoretical quantity of electricity of the anode was 2,215 mAh.

EXAMPLE 24

In the same manner as in Example 23 but changing the amount of pyrene to 7%, there was manufactured a non-aqueous electrochemical cell of the thionyl chloridelithium system (Unit III).

EXAMPLE 25

In the same manner as in Example 23 but using 1,2-benzanthracene (2%) in place of pyrene (2%), there was manufactured a non-aqueous electrochemical cell of the thionyl chloride-lithium system (Unit III).

EXAMPLE 26

In the same manner as in Example 23 but using perylene (2%) in place of pyrene (2%), there was manufactured a non-aqueous electrochemical cell of the thionyl chloride-lithium system (Unit III).

Example 27

In the same manner as in Example 23 but using pentacene (5%) in place of pyrene (2%), there was manufactured a non-aqueous electrochemical cell of the thionyl chloride-lithium system (Unit III).

EXAMPLE 28

In the same manner as in Example 23 but using benzo(a)pyrene (5%) in place of pyrene (2%), there was manufactured a non-aqueous electrochemical cell of the thionyl chloride-lithium system (Unit III).

EXAMPLE 29

In the same manner as in Example 23 but using 1,2,5-dibenzanthracene (3%) in place of pyrene (2%), there was manufactured a non-aqueous electrochemical cell of the thionyl chloride-lithium system (Unit III).

EXAMPLE 30

In the same manner as in Example 23 but using coronene (5%) in place of pyrene (2%), there was manufactured a non-aqueous electrochemical cell of the thionyl chloride-lithium system (Unit III).

EXAMPLE 31

In the same manner as in Example 23 but using coronene (10%) in place of pyrene (2%), there was manufactured a non-aqueous electrochemical cell of the thionyl chloride-lithium system (Unit III).

EXAMPLE 32

In the same manner as in Example 23 but using anthracene (1.2%) in place of pyrene (2%), there was manufactured a non-aqueous electrochemical cell of the thionyl chloride-lithium system (Unit III).

EXAMPLE 33

In the same manner as in Example 23 but using anthracene (5%) in place of pyrene (2 L%), there was manufactured a non-aqueous electrochemical cell of the thionyl chloride-lithium system (Unit III).

EXAMPLE 34

In the same manner as in Example 23 but using benzothiophene (1%) in place of pyrene (2%), there was manufactured a non-aqueous electrochemical cell of the thionyl chloride-lithium system (Unit III).

EXAMPLE 35

In the same manner as in Example 23 but using 2,4,6-trichlorobenzothiophene (1.5%) in place of pyrene (2%), there was manufactured a non-aqueous electrochemical cell of the thionyl chloride-lithium system (Unit III).

EXAMPLE 36

In the same manner as in Example 23 but using 9,10-anthraquinone (2.5%) in place of pyrene (2%), there was manufactured a non-aqueous electrochemical cell of the thionyl chloride-lithium system (Unit III).

EXAMPLE 37

In the same manner as in Example 23 but using 2,3,6,7-tetrachloroanthraquinone (3%) in place of pyrene (2%), there was manufactured a non-aqueous electrochemical cell of the thionyl chloride-lithium system (Unit III).

Each cell as obtained in Examples 23 to 37 and Comparative Examples 1 to 3 was stored at 60° C. for 20 days without any previous discharge or after 60% discharge. The thus stored cell was discharged with a load of 10 ohms for 50 ms at 20° C. and subjected to measurement of the closed circuit voltage. The results are shown in Table 2.

Also, each cell as obtained in Examples 23 to 37 and Comparative Examples 1 to 3 was subjected to measurement of the discharged quantity of electricity upon discharge with a load of 300 ohms at 20° C. immediately after the manufacture (i.e. before storage) and after storage at 80° C. for 20 days. The results are shown in Table 3.

TABLE 2

| Example No. | Aromatic compound | Incorporated into | Amount (%) | Closed circuit voltage upon discharge with a load of 10 ohms for 50 ms at 20° C. after storage at 60° C. for 20 days (V) | |
|---|---|---|---|---|---|
| | | | | Before discharge | After 60% discharge |
| 23 | Pyrene | Collector | 2 | 2.138 | 2.272 |
| 24 | Pyrene | Collector | 7 | 2.183 | 2.311 |
| 25 | 1,2-Benzanthracene | Collector | 2 | 1.897 | 2.084 |
| 26 | Perylene | Collector | 2 | 2.115 | 2.293 |
| 27 | Pentacene | Collector | 5 | 1.972 | 2.181 |
| 28 | Benzo[a]pyrene | Collector | 5 | 2.083 | 2.237 |
| 29 | 1,2,5,6-Dibenzanthracene | Collector | 3 | 1.966 | 2.074 |
| 30 | Colonene | Collector | 5 | 2.004 | 2.205 |
| 31 | Colonene | Collector | 10 | 2.067 | 2.191 |
| 32 | Anthracene | Collector | 1.2 | 2.176 | 2.153 |
| 33 | Anthracene | Collector | 5 | 2.206 | 2.294 |
| 34 | Benzothiophene | Collector | 1 | 2.030 | 2.114 |
| 35 | 2,4,6-Trichlorobenzothiophene | Collector | 1.5 | 1.982 | 2.108 |
| 36 | 9,10-Anthraquinone | Collector | 2.5 | 2.149 | 1.872 |
| 37 | 2,3,6,7-Tetrachloroanthraquinone | Collector | 3 | 2.173 | 2.047 |
| Comparative | | | | | |
| 1 | — | — | — | 1.189 | 0.497 |
| 2 | Polyethylene chloride | Electrolyte | 0.1 g/l | 1.203 | 0.618 |
| 3 | Polyethylene oxide | Electrolyte | 0.1 g/l | 1.200 | 0.705 |

TABLE 3

| Example No. | Before storage | | Discharge after storage at 80° C. for 20 days | |
|---|---|---|---|---|
| | Quantity of electricity (mAh) | Rate of Comparative Example 1 | Quantity of electricity (mAh) | Retention before storage |
| 23 | 2007 | 103 | 1946 | 97 |
| 24 | 1975 | 105 | 1900 | 96 |
| 25 | 1954 | 100 | 1837 | 94 |
| 26 | 2032 | 104 | 1930 | 95 |
| 27 | 1963 | 101 | 1865 | 95 |
| 28 | 2014 | 103 | 1930 | 96 |
| 29 | 1966 | 101 | 1850 | 94 |
| 30 | 2037 | 104 | 1975 | 97 |
| 31 | 2048 | 105 | 1987 | 97 |
| 32 | 1990 | 102 | 1750 | 88 |
| 33 | 1948 | 100 | 1540 | 79 |
| 34 | 1935 | 99 | 1646 | 85 |
| 35 | 1938 | 99 | 1686 | 87 |
| 36 | 1968 | 101 | 1771 | 90 |
| 37 | 1953 | 100 | 1816 | 93 |
| Comparative | | | | |
| 1 | 1950 | 100 | 1834 | 94 |
| 2 | 1961 | 101 | 1804 | 92 |
| 3 | 1973 | 101 | 1854 | 94 |

From Table 2, it is understood that upon discharge of non-discharged cells with a load of 10 ohms for 50 ms after storage at 60° C. for 20 days, those not incorporated with any aromatic compound (Comparative Example 1) produce great voltage drop, i.e. showing a closed circuit voltage of 1.189 V, while those incorporated with an aromatic compound (Examples 23 to 37) do not produce any significant voltage drop, i.e. showing a closed circuit voltage of about 1.9 to 2.2 V. Likewise, upon discharge of 60% discharged cells under the same conditions as above after storage at 60° C. for 20 days, those incorporated with an aromatic compound (Examples 23 to 37) do not produce any significant voltage drop, i.e. showing a closed circuit of about 1.9 to 2.3 V. When, however, incorporated with chlorinated polyethylene (Comparative Example 2) or polyethylene oxide (Comparative Example 3), significant voltage drop is produced even in case of non-discharged cells.

From Table 3, it is understood that the discharge quantity of electricity of the cells incorporated with an aromatic compound (Examples 23 to 37 before storage is nearly equal to or higher than that of the cells not incorporated with any aromatic compound (Comparative Example 1). Thus, the incorporation of an aromatic compound does not produce any reduction in the discharge quantity of electricity.

It is also understood from Table 3 that the cells incorporated with an aromatic compound having 4 or more benzene rings (Examples 23 to 30) show a high retention (94 to 97%) of the discharge quantity of electricity even after storage at 80° C. for 20 days (Examples 23 to 30) and do not cause any significant decrease of such high retention even if used in a higher amount (Examples 23 and 24).

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A non-aqueous electrochemical cell comprising an anode containing an alkali metal as an essential component of the active anode material, a cathode collector comprising a carbonaceous porous shaped body and a cathode-electrolyte consisting of an ionically conductive solution of a solute in a solvent containing a liquid oxyhalide, characterized in that at least one of the electrolyte and the collector is incorporated with a carbocyclic aromatic compound having at least two benzene rings selected from the group consisting of naphthalene, anthracene, pyrene 1,2-benzanthracene, perylene, pentacene, triphenylene, benz(a)-pyrene, 1,2,3,4-dibenzanthracene, 1,2,5,6-dibenzathracene, benz(ghi)perylene and coronene.

2. The cell according to claim 1, wherein the incorporation of the aromatic compound is made to make a concentration of $1 \times 10^{-6}$ to $1 \times 10^{-2}$ mol/l in the electrolyte.

3. The cell according to claim 1, wherein the incorporation of the aromatic compound is made into the electrolyte to make a concentration of $1 \times 10^{-6}$ to $1 \times 10^{-2}$ mol/l in the electrolyte.

4. The cell according to claim 1, wherein the incorporation of the aromatic compound is made into the collector in an amount of 0.05 to 20% by weight based on the weight of the collector.

5. A non-aqueous electrochemical cell comprising an anode containing an alkali metal as an essential component of the active anode material, a cathode collector comprising a carbonaceous porous shaped body and a cathode-electrolyte consisting of an ionically conductive solution of a solute in a solvent containing a liquid oxyhalide, characterized in that at least one of the electrolyte and the collector is incorporated with a chlorinated carbocyclic aromatic compound having at least two benzene rings.

6. A non-aqueous electrochemical cell comprising an anode containing an alkali as an essential component of the active anode material, a cathode collector comprising a carbonaceous porous shaped body and a cathode-electrolyte consisting of an ionically conductive solution of a solute in a solvent containing a liquid oxhalide, characterized in that at least one of the electrolyte and the collector is incorporated with an oxygen or sulfur-containing aromatic compound selected from the group consisting of 2,6-di-t-butyl-1,4-benzoquinone, 1,8-naphthalic anhydride, 9,10-anthraquione, benzothiophene, dibenzothiophene, 4-phenylthiophene, thiochroman-4-one and thioxanthen-9-one.

7. A non-aqueous electrochemical cell comprising an anode containing an alkali metal as an essential component of the active anode material, a cathode collector comprising a carbonaceous porous shaped body and a cathode-electrolyte consisting of an ionically conductive solution of a solute in a solvent containing a liquid oxyhalide, characterized in that at least one of the electrolyte and the collector is incorporated with a chlorinated oxygen or sulfur containing aromatic compound.

8. The cell according to claim 5, wherein the incorporation of the aromatic compound is made to make a concentration of $1 \times 10^{-6}$ to $1 \times 10^{-2}$ mol/l in the electrolyte.

9. The cell according to claim 5, wherein the incorporation of the aromatic compound is made into the electrolyte to make a concentration of $1 \times 10^{-6}$ to $1 - 10^{31\,2}$ mol/l in the electrolyte.

10. The cell according to claim 5, wherein the incorporation of the aromatic compound is made into the collector in an amount of 0.05 to 20% by weight based on the weight of the collector.

11. The cell according to claim 6, wherein the incorporation of the aromatic compound is made to make a concentration of $1 \times 10^{-6}$ to $1 \times 10^{-2}$ mol/l in the electrolyte.

12. The cell according to claim 6, wherein the incorporation of the aromatic compound is made into the electrolyte to make a concentration of $1 \times 10^{-6}$ to $1 \times 10^{-2}$ mol/l in the electrolyte.

13. The cell according to claim 6, wherein the incorporation of the aromatic compound is made into the collector in an amount of 0.05 to 20% by weight based on the weight of the collector.

14. The cell according to claim 7, wherein the incorporation of the aromatic compound is made to make a concentration of $1 \times 10^{-6}$ to $1 \times 10^{-2}$ mol/l in the electrolyte.

15. The cell according to claim 7, wherein the incorporation of the aromatic compound is made into the electrolyte to make a concentration of $1 \times 10^{-6}$ to $1 \times 10^{31\,2}$ mol/l in the electrolyte.

16. The cell according to claim 7, wherein the incorporation of the aromatic compound is made into the collector in an amount of 0.05 to 20% by weight based on the weight of the collector.

* * * * *